United States Patent [19]

Aldridge, III

[11] Patent Number: 5,699,753

[45] Date of Patent: Dec. 23, 1997

[54] ANIMAL FEEDER

[76] Inventor: James K. Aldridge, III, Rte. 1 Box 419, La Grange, N.C. 28551

[21] Appl. No.: 511,108

[22] Filed: Aug. 4, 1995

[51] Int. Cl.$^6$ .................................................. A01K 39/012
[52] U.S. Cl. ............................................. 119/52.1; 119/52.4
[58] Field of Search ................................. 119/52.1, 52.2, 119/52.3, 52.4, 53, 53.5, 54, 77

[56] References Cited

U.S. PATENT DOCUMENTS

| | | | |
|---|---|---|---|
| 364,557 | 6/1887 | Walin | 119/53 |
| 503,664 | 8/1893 | Jones | 119/53 |
| 581,952 | 5/1897 | Amos | 119/77 |
| 1,584,536 | 5/1926 | Healy et al. | 119/77 |
| 1,815,964 | 7/1931 | Boyer | 119/77 |
| 2,216,511 | 10/1940 | Copeman | 119/52.3 |
| 2,941,506 | 6/1960 | Fulton | 119/53 |
| 5,062,388 | 11/1991 | Kilham | 119/52.2 |
| 5,140,945 | 8/1992 | Barnhart et al. | 119/53 X |

Primary Examiner—Robert P. Swiatek
Assistant Examiner—Elizabeth Shaw
Attorney, Agent, or Firm—Rhodes, Coats, & Bennett, LLP

[57] ABSTRACT

An animal feeder having a lower base member that includes an annular trough and a cylindrical feed tube that is supported on the lower base member. Formed about the lower end of the cylindrical feed tube is a plurality of feed cut-outs that are disposed adjacent the annular trough of the base member. Feed is contained within the cylindrical feed tube and flows by gravity downwardly through the feed cut-outs into the annular feed trough formed in the lower base member.

18 Claims, 3 Drawing Sheets ably, these feeding devices have drawbacks and shortcomings. For example, to protect against infection, bacteria and disease, it is known to utilize cardboard feeders which are disposable after the poults have reached an age of
5,699,753

1
ANIMAL FEEDER

FIELD OF THE INVENTION

The present invention relates to animal feeders, and more particularly to a two-piece gravity flow feeder designed for feeding young turkeys referred to as poults.

BACKGROUND OF THE INVENTION

Raising turkeys is a very competitive business and requires the turkey farmer to pay close attention to feeding and caring for the turkeys and to protecting the turkey flock from disease, infections and bacteria.

One particular problem the turkey farmer faces is that of caring for young turkeys that have an age of one to six days and which are commonly referred to as poults. These poults are usually placed in relatively small confined areas that are sometimes referred to as brooding rings. Within the area there is provided feeding and watering devices. A number of feeding devices have been employed in the past for feeding poults. Invariably, these feeding devices have drawbacks and shortcomings. For example, to protect against infection, bacteria and disease, it is known to utilize cardboard feeders which are disposable after the poults have reached an age of five to six days and are prepared to leave the confined area or the brooding ring. This, of course, means that with each flock the turkey farmer has to purchase new cardboard feeders. This is obviously expensive and drives up the total production cost for the turkey flock.

To avoid the cost of utilizing disposable feeders, some turkey farmers have utilized permanent feeders. One such permanent feeder design comprises an elongated shallow plastic tray. Obviously, after the tray has been used with one flock of poults, the tray has to be cleaned, washed and disinfected. However, the design of common permanent feeding devices for poults are such that the feeders themselves include cracks and crevices and hard to reach areas that cannot be cleaned and disinfected efficiently. The result is that bacteria, germs and other harmful microorganisms remain on the permanent feeders when placed in use with a new flock of poults. Thus, the bacteria, germ and other harmful microorganisms are transferred from one flock to another flock and this results in high mortality loss and in the end, substantially effects the profit made by the turkey farmer.

Another drawback and shortcoming of feeders designed especially for poults is that the feeders have to be filled on a daily or periodic basis. This is of course time consuming and very labor intensive and in the end is expensive. There is a need for a poult feeder that will hold enough feed to feed a group of poults through the critical period of one to six days of age and which will function to continuously dispense feed to the poult flock without the feeders being required to be repeatedly filled during the first six days of the life of the poults.

SUMMARY AND OBJECTS OF THE INVENTION

The present invention entails an animal feeder that is specifically designed to accommodate poults, small chickens and other animals as well. The feeder of the present invention is a permanent feeder that is simple in construction, economical to build and which is specifically designed such that the entire feeder can be efficiently cleaned and disinfected between flocks.

The animal feeder of the present invention includes a lower base member having an annular feeding trough

2 formed around the periphery thereof. A cylindrical feed tube is designed to be supported on the base member. The cylindrical feed tube includes a cylindrical wall structure with opposed open upper and lower ends. Formed about the periphery of the lower end of the cylindrical feed tube is a plurality of elongated horizontally disposed feed cut-outs which permits feed to flow by gravity from interiorly of the cylindrical feed tube into the annular feed trough of the lower base member.

The lower base member includes an upwardly projecting central island formed therein that projects into the lower open end of the cylindrical feed tube when the cylindrical feed tube is supported on the lower base member. Since the central island projects into the cylindrical feed tube it follows that the island tends to center the central feed tube and effectively stations the same over the lower base member. As such, the central island prohibits the cylindrical feed tube from shifting laterally back and forth within the base member and appropriately spaces the feed cut-outs relative to the annular trough such that feed flowing by gravity through the feed cut-outs passes directly into the annular trough.

In addition, the animal feeder of the present invention is provided with a fastening structure such that the cylindrical feed tube can be quickly and easily fastened to the lower base member to form a single integral structure.

It is therefore an object of the present invention to provide an animal feeder particularly designed to accommodate poults and which is relatively simple in design, easy to manufacture, and economical.

Another object of the present invention is to provide a permanent type animal feeder that can be easily and effectively cleaned and completely disinfected.

Another object of the present invention is to provide an animal feeder that has a relatively large feed capacity that will enable the feeder to be filled and serve a flock of poults during the first six days of life.

Another object of the present invention is to provide an animal feeder that is designed to provide a constant feed level at all times within the feeder.

Another object of the present invention is to provide an animal feeder of the character referred to above that is designed so as to include no moving parts.

Other objects and advantages of the present invention Will become apparent and obvious from a study of the following description and the accompanying drawings, which are merely illustrative of such invention.

DETAILED DESCRIPTION OF THE INVENTION

Figure 1:
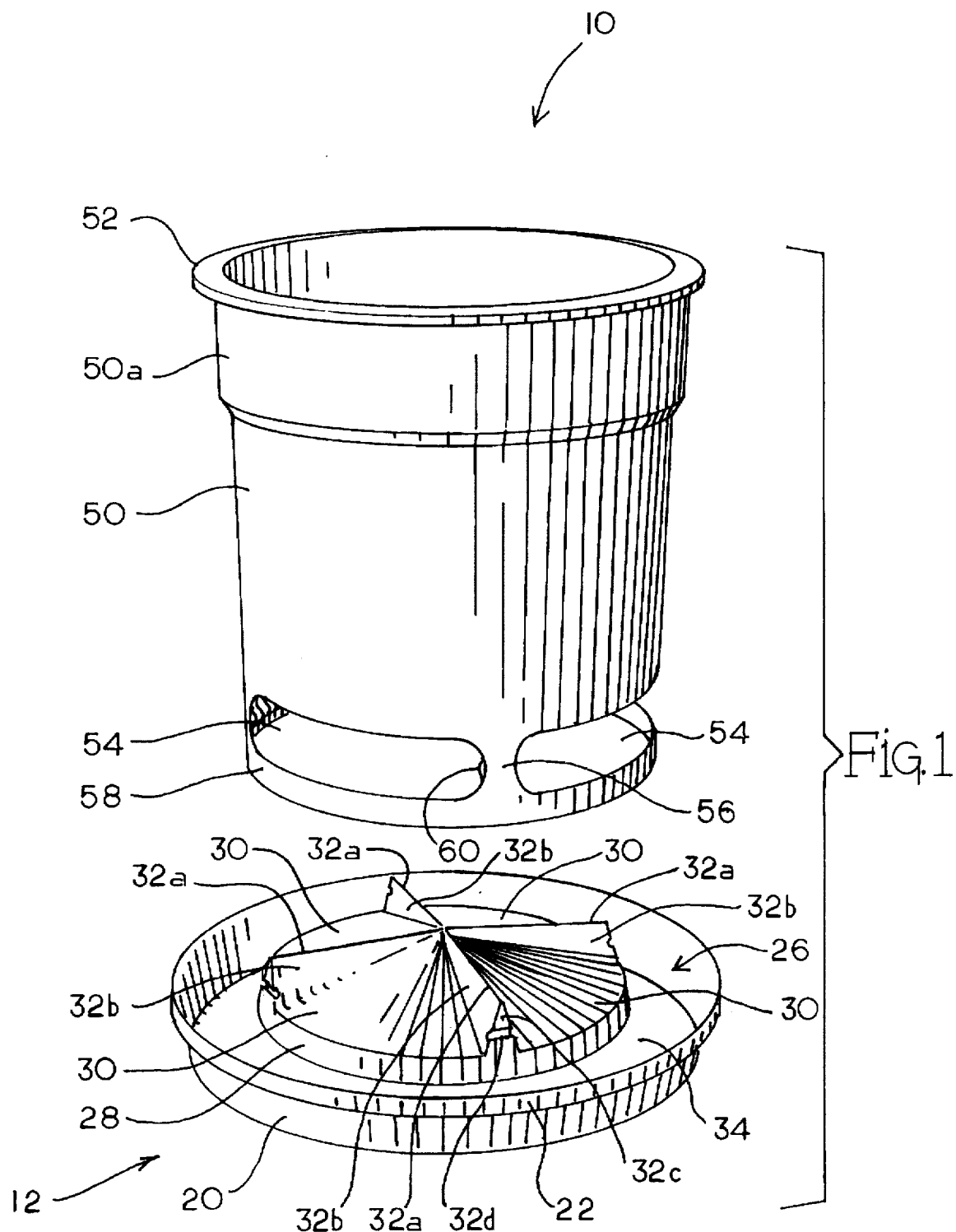
FIG. 1 is a perspective exploded view of the animal feeder of the present invention.
Figure 2:
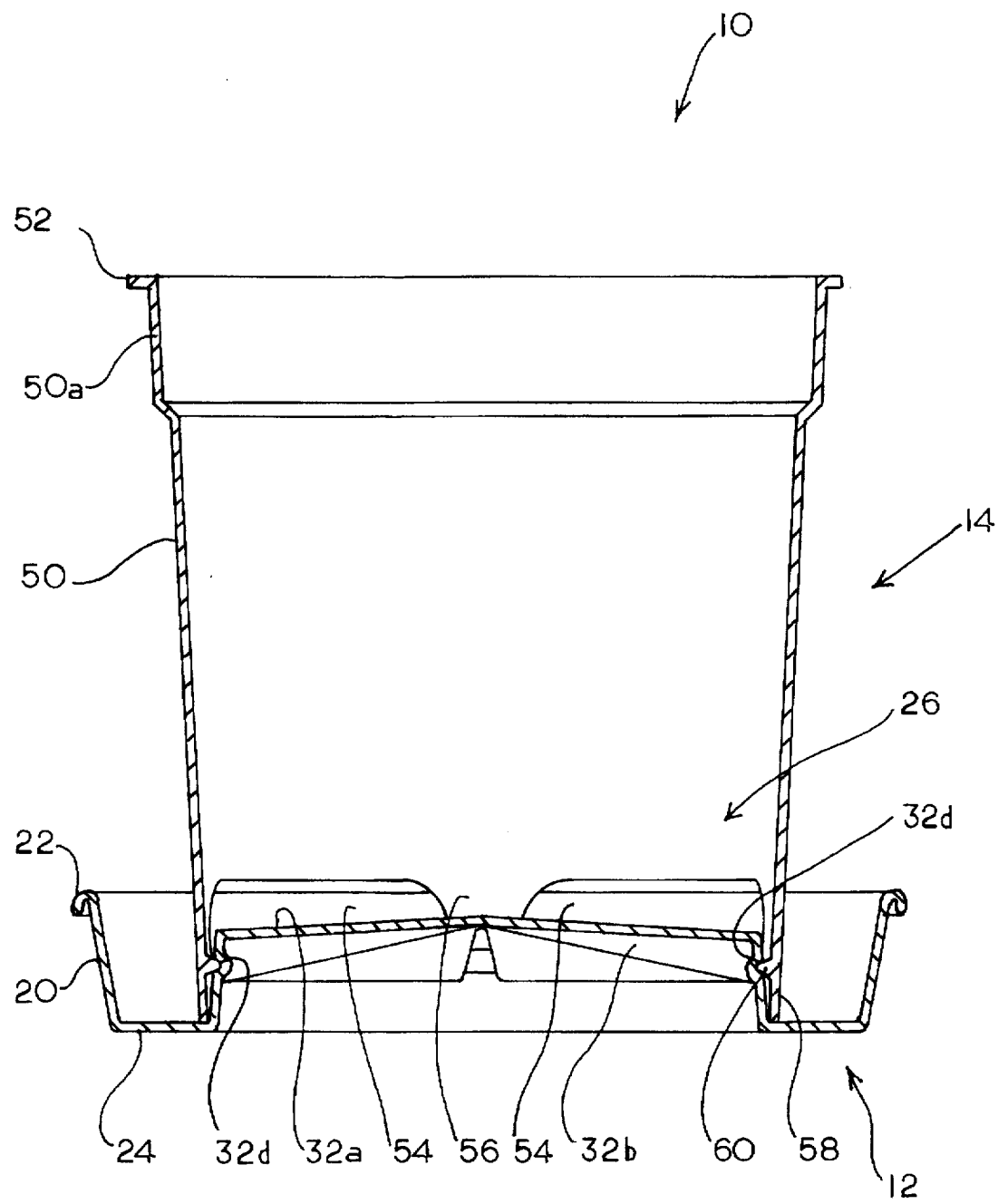
FIG. 2 is a vertical cross-sectional view of the animal feeder of the present invention.
Figure 3:
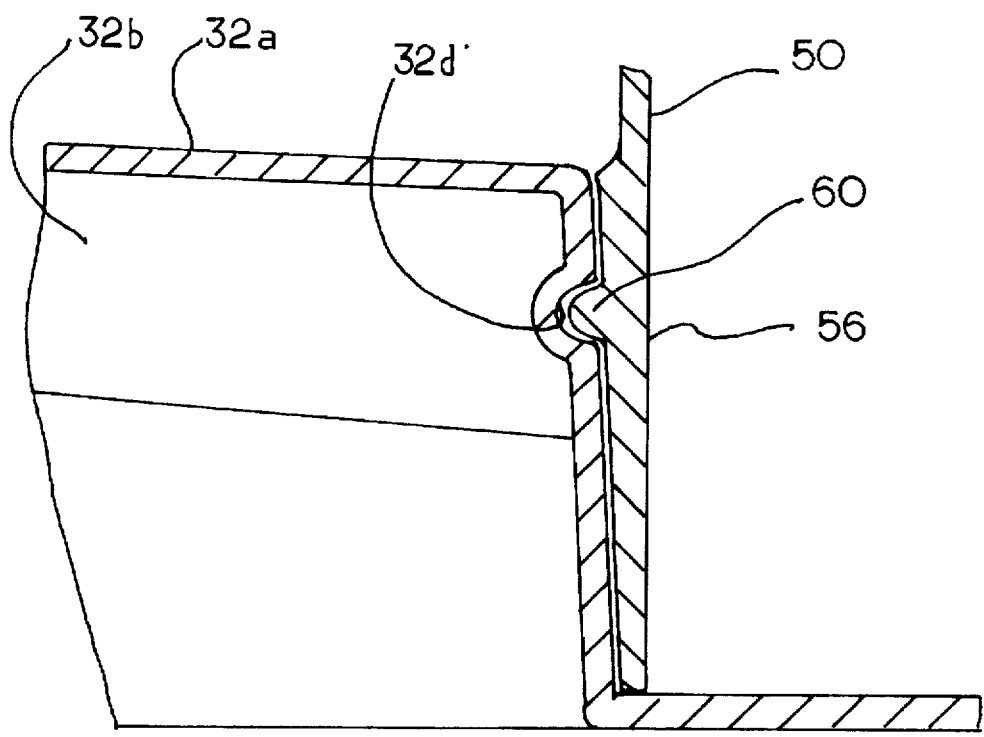
FIG. 3 is a fragmentary vertical sectional view illustrating the fastening structure for connecting the cylindrical feed tube with the lower base member.

With further reference to the drawings, the animal feeder of the present invention is shown therein and indicated generally by the numeral 10. Viewing animal feeder 10 in detail, the same comprises a lower base member indicated generally by the numeral 12 and a cylindrical feed tube indicated generally by the numeral 14. As indicated in the drawings, cylindrical feed tube 14 is designed and adapted to be supported on base member 12.

With particular reference to lower base member 12, it is seen that the same includes an outer cylindrical edge 20. A surrounding lip or bead 22 extends around the upper portion of the outer edge 20. Base member 12 includes a bottom 24.

Formed centrally in the lower base member 12 is a central raised island indicated generally by the numeral 26. As will be appreciated from subsequent portions of this disclosure, central island 26 is designed to project into the lower open end of the cylindrical feed tube 14 when the feed tube 14 is supported on the lower base member 12. Central island 26 includes a surrounding edge 28 and an inclined top surface. It will be appreciated that the inclined top surface includes a raised center point and that a substantial portion of the top surface of the central island 26 inclines downwardly from the center point of the island. In particular, as illustrated in FIG. 1, the top of the central island 26 comprises a downwardly sloping top surface 30 that again slopes downwardly from the center point towards the outer edge 28. Also formed on the top surface of the central island 26 is a plurality of evenly spaced raised radials. The raised radials are of a generally inverted V-shape and include a top edge 32a, sides 32b, and an end edge 32c, and a generally horizontally oriented groove 32d formed in the end edge 32c. Effectively, the raised radials sub-divide the top surface of the central island 26. Again, it is appreciated that the top surface of the central island 26 lying between the respective raised radials is inclined downwardly from the center point of the island towards the outer edge 28 of the island.

Defined between the outer edge 28 of the central island 26 and the edge 20 is an annular or circumferential feeding trough 34. As will be appreciated from subsequent portions of this disclosure, feed will gravitate downwardly onto the central island 26 and will thereafter move generally downwardly and outwardly towards the feeding trough 34.

Now, turning to the cylindrical feed tube 12, it is seen that the same includes a cylindrical wall structure 50 that includes an interior side and an exterior side. Forming a part of the cylindrical wall structure 50 is an upper cylindrical rim 50a that extends slightly outwardly from the major portion of the cylindrical wall structure 50. Extending around the open top of the cylindrical feed tube 14 and adjacent the upper portion of the upper rim 50a is an upper lip 52.

As seen in the drawings, a cylindrical feed tube 14 includes an open top and an open bottom. Formed in the cylindrical wall structure 50 adjacent the lower open bottom is a series of feed cut-outs 54. The feed cut-outs 54 are elongated and horizontally oriented. Note that each feed cut-out 54 includes upper and lower parallel edges while the respective ends of each feed cut-out 54 is generally curved or arcuate shaped. Formed between the respective feed cut-outs 54 is an area referred to as a connecting area or section 56. The connecting areas 56 lying between respective feed cut-outs 54 extend downwardly and join a surrounding lower rim 58. It is appreciated that lower rim 58 forms the bottom of the cylindrical feeding tube 14 and also forms the structure that surrounds the lower portion of each respective feed cut-out 54. Thus, the surrounding lower rim 58 tends to support the entire feed tube 14 as the connecting sections 56 join and connect the major portion of the cylindrical wall structure 50 with the lower rim 58.

The feed cut-outs 54 are particularly spaced and arranged such that when the cylindrical feed tube 14 is properly supported on the lower base member 12, the lower edge of the respective feed cut-outs 54 will lie at essentially the same elevation as the surrounding top surface 30 of the central island 26 along a line where the central island lies adjacent the feed cut-outs 54. In other words, the lower edge of each respective feed cut-out 54 will lie adjacent the top of the surrounding outer edge 28 of the central island when the cylindrical feed tube 14 is placed on and supported by the lower support member 12.

It is desirable for the animal feeder 10 of the present invention to have the capability of fastening or connecting the lower base member 12 to the cylindrical feed tube 14. This will enable the feed tube 14 to be easily connected and disconnected with respect to the lower base member 12. To achieve this, the feeder 10 of the present invention is provided with a fastening structure that can be easily and conveniently attached and detached. As already described, the raised radials extending about the top of the central island 26 include an outer or end edge 32c that is provided with the generally horizontal groove 32d. There is also provided on the inside of the cylindrical wall 50 a locking bead 60 that is designed to mate with the respective grooves 32d so as to secure the entire cylindrical feed tube 14 to the lower base member 12. In particular, the locking bead 60 is provided on the inside of the connecting areas 56 that lie between the respective feed cut-outs 54. It will be appreciated that each locking bead 60 is spaced so as to properly align with respective grooves 32d formed on the end of the raised radials. It is appreciated that the cylindrical feed tube 14 can be secured to the lower base member 12 by simply lowering the cylindrical feed tube into the feeding trough 34 such that the locking beads 60 are offset and not aligned with the respective raised radials. Once the cylindrical feed tube 14 is properly seated in the feeding trough 34, then the cylindrical tube 14 can be rotated with respect to the lower base member 12 causing the respective locking beads 60 to be extended into and through the respective grooves 32d. Once the cylindrical feed tube 14 has been sufficiently rotated such that the locking beads 60 and the grooves 32 are properly aligned and disposed in face-to-face relationship, a fastened or secured mode is achieved. At this point, the cylindrical feed tube 14 and the lower base member 12 form one integral unit. To separate the cylindrical feed tube 14 from the lower base member 12, the cylindrical tube 14 is simply rotated to where the locking beads 60 are disengaged from the respective locking grooves 32d formed in the respective raised radials. In a disassembled state, it follows that the entire feeder 10 and its components can be easily and conveniently disinfected.

In operation, once the cylindrical feed tube 14 is supported on the lower base member 12, and if desired secured thereto, feed is poured into the open end top of the feed tube. Once the feed is contained within the cylindrical feed tube 14 it follows that the feed will move by gravity downwardly through the feed tube and out the feed cut-outs 54 into the surrounding feeding trough 34. Because of the design of the feeder 10 of the present invention, a generally constant feed level will be maintained in the feeding trough 34. It is appreciated that as the feed moves downwardly in the cylindrical feed tube that the inclined and sloping top surface of the central island 26 will direct the feed from the inner areas of the cylindrical feed tube 14 outwardly therefrom and through the feed cut-outs 54 into the annular feeding trough 34. Note also that the raised radials are designed such that they include the upper top edge 32a that prevents the accumulation of feed thereon and in turn encourages the feed to move downwardly and outwardly through the cut-outs 54. Moreover, the raised radials prevent feed from accumulating adjacent the connecting areas 56 formed between the respective feed cut-outs 54.

It is appreciated that the feeder 10 of the present invention can be constructed of various materials. However, it is believed that in a preferred design, the feeder 10 would be constructed of a plastic material and it is appreciated that the components of the feeder 10 could be actually formed by a plastic molding process.

From the foregoing specification and discussion, it is seen that the feeder 10 of the present invention can be used to feed a variety of animals but is especially designed for use with small turkeys, poults. The design of feeder 10 is relatively simple and can be easily manufactured at an economical cost. The various components, that is the cylindrical feed tube 14 and the lower base member 12, are designed with tapering wall structures that are sufficiently tapered to enable these components to be nested together. This obviously conserves space and enables the components of the feeder 10 to be efficiently packed for storage or transport.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A two-piece animal feeder for feeding animals such as small turkeys and chickens, comprising:
   a) a base member having an annular feeding trough defined about the periphery thereof;
   b) a cylindrical feed tube having a cylindrical wall structure having inner and outer sides and upper and lower open ends, the cylindrical feed tube being designed to be supported on the base member and functioning to confine feed therein end to direct the feed downwardly by gravity to the annular feeding trough;
   c) a raised central island formed in the base member with the central island projecting upwardly from the base member and designed to project upwardly in the lower open end of the feed tube so as to generally center the feed tube about the base member and to limit lateral movement of the feed tube with respect to the base member;
   d) a series of spaced apart elongated horizontal feed cut-outs formed in the cylindrical wall of the feed tube adjacent the lower open end, the feed cut-outs being normally disposed adjacent the annular feeding trough when the feed tube is supported on the base member thereby directing the gravity flowing feed from the feed tube downwardly and outwardly through the feed cut-outs into the annular feeding trough; and
   e) a fastening structure for attaching the cylindrical feed tube to the base member including cooperating fasteners formed on the inside wall of the cylindrical wall structure of the feed tube and on the centering island projecting upwardly from the base member, and wherein the fasteners are operative to assume an unattached and an attached mode, and wherein the fasteners associated with the feed tube and base member include at least one groove and a mating locking bead with the locking bead adapted to be inserted into the groove to form a locked relationship.

2. The animal feeder of claim 1 wherein the groove is formed about the outer surface of the central island and the locking bead is formed along the inside of the cylindrical wall of the feed tube.

3. The animal feeder of claim 2 wherein the central island is provided with a plurality of raised radials that project across the top portion of the central island and wherein at least one raised radial includes an outer side and wherein the groove that forms a part of the fastening structure is formed in the outer side of the raised radial and wherein the locking bead formed on the inside wall of the feed tube is adapted to project and extend into the groove so as to effectively lock the cylindrical feed tube with the base member.

4. The animal feeder of claim 3 wherein the raised radial assumes a generally inverted V-shape.

5. The animal feeder of claim 4 wherein there is formed a connecting wall section between the respective feed cut-outs and wherein the locking bead of the fastener structure is formed on the inside of the connecting wall section such that the feed tube can be connected to the base member in such a fashion that the respective raised radials project towards and generally align with the connecting wall section disposed between the respective feed cut-outs when the cylindrical feed tube is secured to the base member.

6. The animal feeder of claim 1 wherein there is formed a relatively short supporting rim formed around the open bottom of the feed tube and which also forms the lower edge of the respective feed cut-outs.

7. The animal feeder of claim 6 wherein both the feed tube and the base member are designed such that each can be nested into corresponding structures for convenient handling and packing.

8. The animal feeder of claim 7 wherein there is formed a cylindrical rim around the top portion of the cylindrical wall structure that forms the feed tube and wherein there is a lip that projects outwardly from the open top of the cylindrical feed tube.

9. An animal feeder for feeding animals such as small turkeys, comprising:
   a) a base member having an annular feeding trough defined therein;
   b) a cylindrical feed tube having an open cylindrical wall structure with opposed upper and lower open ends with the cylindrical feed tube being designed to be supported on the base member such that the annular feeding trough is defined adjacent the outer lower portion of the cylindrical feed tube when the same is supported on the base member;
   c) at least one feed opening formed in the feeder for directing feed from the feed tube into the annular feeding trough of the base member;
   d) a raised island formed in the base member with the island protecting upwardly from the base member into the lower open end of the feed tube the feed tube is supported by the base member; and
   e) a fastening structure associated with both the base member and the cylindrical feed tube for attaching the cylindrical feed tube to the base member, the fastening structure including an interlocking groove and a locking bead structure wherein the locking bead can be turned into engagement with the groove to create a locked relationship between the base member and the cylindrical feed tube.

10. The animal feeder of claim 9 wherein the groove is associated with the raised island formed in the base member and wherein the locking bead is formed on the inside wall of the feed tube.

11. The animal feeder of claim 10 wherein the respective feed cut-outs include opposed upper and lower edges that extend generally horizontally within the side wall structure of the cylindrical feed tube and opposed ends that are generally arcuate shaped.

12. The animal feeder of claim 10 wherein there is provided a series of raised radials extending across the top of the centering island with the respective raised radials being of an inverted V-shape and including an outer edge and wherein the outer edge of at least one raised radial includes the groove that forms a part of the fastener structure for fastening the cylindrical feed tube to the base member and wherein the locking bead is formed on the inside of the cylindrical wall structure and is designed to mate and lock with the groove formed in the outer edge of the raised radial.

13. An animal feeder for feeding animals such as small turkeys, comprising:
 a) a base member having an outer feed holding area, an outer wall, and a series of spaced apart supports disposed upwardly of the outer wall with the supports including a groove formed therein;
 b) a cylindrical feed tube having upper and lower end portions with the cylindrical feed tube being designed to be supported on the base member;
 c) at least one feed opening formed in the feeder for directing feed from the feed tube into the feed holding area of the base member; and
 d) a cooperating fastening structure formed on the base member and feed tube for fastening the feed tube to the base member, the cooperating fastening structure including the groove formed on the base member and an attaching member extending from the feed tube and including at least one break therein that permits the attaching member to align with the groove before the attaching member is secured to the groove, wherein the fastening and unfastening is achieved by rotating either the feed tube or the base member relative to the other and causing the attaching member to be turned in the groove.

14. The animal feeder of claim 13 wherein the base member includes a series of circumferentially spaced grooves.

15. The feeder of 14 wherein the grooves are inwardly spaced from the outer wall of the base member, and wherein the feed tube includes a wall having the attaching member formed thereon and wherein the attaching member is formed about the lower end portion of the end feed tube.

16. The feeder of claim 13 wherein the base member includes an inner island.

17. The feeder of claim 13 wherein the base member includes an inner island and wherein the supports having the groove formed therein are formed on the inner island and wherein in a fastened state the feed tube extends downwardly over at least a portion of the supports and the attaching member projects from the feed tube into the groove of the supports.

18. The feeder of claim 17 wherein there is provided at least two supports having the groove formed therein and wherein the supports are spaced such that the respective grooves form segments of a circle.

* * * * *